No. 749,343. PATENTED JAN. 12, 1904.
M. VOGTHERR.
PROCESS OF TESTING BUTTER.
APPLICATION FILED OCT. 27, 1902.
NO MODEL.
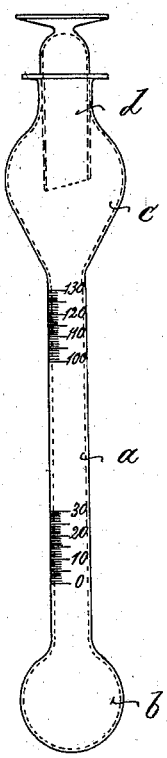

No. 749,343.

Patented January 12, 1904.

UNITED STATES PATENT OFFICE.

MAX VOGTHERR, OF BERLIN, GERMANY.

PROCESS OF TESTING BUTTER.

SPECIFICATION forming part of Letters Patent No. 749,343, dated January 12, 1904.

Application filed October 27, 1902. Serial No. 129,049. (No specimens.)

*To all whom it may concern:*

Be it known that I, MAX VOGTHERR, a subject of the King of Prussia, German Emperor, and a resident of 31ª Luisenstrasse, Berlin, Kingdom of Prussia, German Empire, have invented a new and useful Process of Testing Butter, of which the following is an exact specification.

My invention relates to a process of testing butter, and has for its object to provide a process by means of which the parts by volume of fat and water contained in the butter can be determined in one single operation without using a weighing apparatus or a centrifugal apparatus.

The process consists in mixing a measured quantity of molten butter with sulfuric acid containing amylic alcohol, shaking this mixture, and allowing the same to settle. The fat forms then a layer upon the sulfuric acid, the height and the volume of which layer can easily be determined, while the water is taken up by the sulfuric acid and the quantity of water can easily be determined by determining the augmentation of the volume of the sulfuric acid.

The augmentation of the volume of the sulfuric acid may be determined at the usual temperature, whereas the clear fat layer is advantageously heated to about 90° centigrade. The acid to be used consists of a concentrated sulfuric acid with the specific weight 1,420, to which acid four per cent. of amylic alcohol is added. This percentage is necessary, as in using a smaller quantity of amylic alcohol the mixture of butter fat and acid does not settle, and consequently no clear fat layer can be obtained, or at least a determination can only take place after the mixture settling several hours. In using a greater quantity of amylic alcohol practice has shown that a small quantity of the same mixes with the fat, whereby the fat layer is enlarged.

My process may be carried into effect in any convenient way, but advantageously a suitable apparatus—such as shown, for instance, in the accompanying drawing—is used. This apparatus consists of a cylindrical glass receptacle *a*, provided with a graduated scale, the lower end *b* of which receptacle, as well as the upper end *c* of the same, is enlarged. *d* is a stopper for closing the upper opening of the enlarged part *c*.

The process is carried into effect by means of this apparatus in the following manner: A certain quantity of sulfuric acid containing four per cent. of amylic alcohol—for instance, twenty-seven cubic centimeters of this acid—is brought into the lower part *b* of a cylindrical receptacle *a*, provided with a graduation of, for instance, one-tenth cubic centimeter. This acid reaches up to a mark called "0." Hereafter a certain quantity of molten butter—for instance, ten grams—is added to this acid, and the mixture is shaken, so that the components thoroughly mix. In order to allow a good shaking of the mixture, the upper part of the receptacle *c* may also be enlarged. Hereafter the whole mixture contained in the receptacle is brought into a water-bath and heated to about 90° centigrade, whereby the layers will quickly be cleared. After then determining the height of the fat layer the apparatus is cooled, and if the temperature of the mixture is reduced to the ordinary air temperature the height of the liquid contained under the fat layer is determined—*i. e.*, the height above the "0" mark mentioned above.

The percentage of fat is easily found out by a suitable reduction of the quantity of fat upon the ordinary temperature.

The process has the advantage that by means of the same the quantity of water and fat contained in the butter can be quickly found out with sufficient exactitude without using a weighing apparatus or a centrifugal apparatus, so that the butter-dealer is enabled to simply examine the butter every day.

In the apparatus shown in the drawing the receptacle is closed by means of a stopper *d*, which is made hollow and which is adapted to take up the quantity of butter corresponding to the quantity of sulfuric acid contained in the receptacle when the same is filled up to the "0" mark. It will be understood that the quantity of fat, as well as the quantity of water after the fat being separated, and the water being taken up by the sulfuric acid may be determined by means of a different apparatus.

Having thus fully described the nature of this invention, what I desire to secure by Letters Patent of the United States is—

Process of testing butter, consisting in mixing a measured quantity of molten butter with a measured quantity of sulfuric acid, containing four per cent. of amylic alcohol, shaking this mixture, allowing the same to settle, measuring the quantity of clear fat forming the upper layer, and measuring the quantity of sulfuric acid situated underneath the fat layer, deducting from the latter quantity the quantity of sulfuric acid used, thereby finding out the quantity of water contained in the butter, substantially as described and for the purpose set forth.

In testimony whereof I have signed my name to this specification in the presence of two subscribing witnesses.

MAX VOGTHERR.

Witnesses:
    HENRY HASPER,
    WOLDEMAR HAUPT.